(12) United States Patent
Van Mechelen et al.

(10) Patent No.: US 12,099,019 B2
(45) Date of Patent: Sep. 24, 2024

(54) METHOD AND DEVICE DETERMINING SOILING OF A SHIELD (71) Applicant: OTT HYDROMET B.V., Delft (NL)

(72) Inventors: Xander Olivier Van Mechelen, Breda (NL); Joachim Christian Jaus, Delft (NL); Joop Mes, Pijnacker (NL)

(73) Assignee: OTT HYDROMET B.V., Delft (NL)

( * ) Notice: Subject to any disclaimer, the term of this patent is extended or adjusted under 35 U.S.C. 154(b) by 0 days.

(21) Appl. No.: 17/532,558

(22) Filed: Nov. 22, 2021

(65) Prior Publication Data

US 2022/0082512 A1 Mar. 17, 2022

Related U.S. Application Data (62) Division of application No. 16/315,929, filed as application No. PCT/NL2017/050448 on Jul. 4, 2017, now Pat. No. 11,181,485.

(30) Foreign Application Priority Data

Jul. 5, 2016 (NL) .................................... 2017108
Mar. 8, 2017 (NL) .................................... 2018484

(51) Int. Cl.
*G01N 21/958* (2006.01)
*G01J 1/02* (2006.01)
(Continued)

(52) U.S. Cl.
CPC .............. *G01N 21/958* (2013.01); *G01J 1/02* (2013.01); *G01J 5/00* (2013.01); *G01N 21/94* (2013.01);
(Continued)

(58) Field of Classification Search
CPC ... G01N 2021/8822; G01N 2021/9511; G01N 2021/9586; G01N 21/94; G01N 21/958; G01J 1/02; G01J 5/00
See application file for complete search history.

(56) References Cited

U.S. PATENT DOCUMENTS 4,361,403 A 11/1982 Loos
4,435,093 A 3/1984 Krause et al.
(Continued)

FOREIGN PATENT DOCUMENTS

DE 3715798 A1 * 1/1988
DE 4240395 6/1994
(Continued)

OTHER PUBLICATIONS

International Preliminary Examining Authority, Written Opinion of the International Preliminary Examining Authority, date of mailing Jun. 13, 2018, 8 pages.
(Continued)

*Primary Examiner* — Tarifur R Chowdhury
*Assistant Examiner* — Amanda Merlino
(74) *Attorney, Agent, or Firm* — Oliff PLC (57) ABSTRACT A device comprises a housing, a detector for receiving solar irradiance and for providing a detector signal providing an indication of an amount of solar irradiance received by the detector and a shield transparent to at least part of the solar irradiance to be detected, the shield and the housing providing a detector space for housing at least part of the detector. The device further comprises a first light source for emitting light to the shield and a first light sensor arranged to receive light from the first light source, arranged to provide a first signal providing an indication for an amount of light received by the first light sensor. Particles will and reflect light back to the detector space. The reflected light is
(Continued)

received by the light sensor. Hence, a signal generated by the sensor is an indication for pollution of the shield.

21 Claims, 6 Drawing Sheets

(51) Int. Cl.
*G01J 5/00* (2022.01)
*G01N 21/94* (2006.01)
*H02S 50/00* (2014.01)
*G01N 21/88* (2006.01)
*G01N 21/95* (2006.01)

(52) U.S. Cl.
CPC ...... *H02S 50/00* (2013.01); *G01N 2021/8822* (2013.01); *G01N 2021/9511* (2013.01); *G01N 2021/9586* (2013.01)

(56) References Cited

U.S. PATENT DOCUMENTS

| | | | |
|---|---|---|---|
| 4,547,673 A | 10/1985 | Larsen et al. | |
| 4,560,874 A | 12/1985 | Cinzori et al. | |
| 4,826,316 A | 5/1989 | Odum | |
| 5,325,171 A | 6/1994 | Shimizu | |
| 5,914,489 A | 6/1999 | Baliga et al. | |
| 10,554,171 B2 | 2/2020 | Gostein et al. | |
| 2002/0000527 A1* | 1/2002 | Okugawa | G01N 21/958 250/559.08 |
| 2007/0263206 A1 | 11/2007 | LeBlanc et al. | |
| 2009/0015824 A1 | 1/2009 | Shubinsky et al. | |
| 2010/0289650 A1 | 11/2010 | Dittmer et al. | |
| 2011/0085161 A1 | 4/2011 | Thien | |
| 2012/0044344 A1 | 2/2012 | Zheng et al. | |
| 2015/0355017 A1 | 12/2015 | Clarke et al. | |

FOREIGN PATENT DOCUMENTS

| | | |
|---|---|---|
| DE | 102011013975 | 9/2012 |
| DE | 102014214355 | 1/2016 |
| GB | 2175689 | 12/1986 |

OTHER PUBLICATIONS

International Search Report, date of mailing Sep. 21, 2017, 6 pages.
Kipp & Zonen: "Newsletter 36", NL, vol. 36, Apr. 2016, 2 pages, XP002767441, Retrieved from the Internet: URL: http://www.kippzonen.com/Product/12/CMP6-Pyranometer#WKrwlk32bmQ [retrieved on Feb. 20, 2017].

* cited by examiner

METHOD AND DEVICE DETERMINING SOILING OF A SHIELD

TECHNICAL FIELD

The various aspects and embodiments thereof relate to detection of pollution of a shield of a radiometer.

BACKGROUND

Radiometers, such as pyranometers and pyrheliometers, are used for determining incoming radiation from the sun. For proper operation and for determining the actual radiation at the location, originating from the sun, it is important that transparency of protective windows separating a detector from the outside is substantially continuous over time. However, pollutants in the air, either airborne, carried by means of precipitation or present in any other way, deposit on the protective windows. This affects transparency of the protective windows over time, in a not easy to predict way. This, in turn, affects accuracy of measurements. Cleaning is a good solution, but as the progress of soiling is very difficult to predict, cleaning is usually done rather too often than not. This is at a certain cost.

SUMMARY

It is preferred to determine an amount of soiling on the protective window locally.

A first aspect provides a device for detecting solar irradiance. The device comprises a housing, a detector for receiving solar irradiance and for providing a detector signal providing an indication of an amount of solar irradiance received by the detector and a shield transparent to at least part of the solar irradiance to be detected, a shield connection body for connecting the device to the shield and the housing providing a detector space for housing at least part of the detector. The device further comprises a first light source for emitting light to the shield and a first light sensor arranged to receive light from the first light source, arranged to provide a first signal providing an indication for an amount of light received by the first light sensor. The device is arranged to be coupled to a processing unit arranged to compare a value of the first signal to a reference sensor value and arranged to generate a first warning signal if a difference between the sensed value of the sensor signal and the reference sensor value is above a first predetermined threshold. Alternatively or additionally, the processing unit is arranged to determine, based on the first signal, a transmission value related to a transmission factor of the shield for a range of electromagnetic waves and output the transmission.

Usually, if the shield is clean, the shield and in particular the inner wall thereof will reflect only a very small part of the light emitted by the light source. Most of the light emitted by the light sources will travel through the shield, to the outside of the device. However, particles, either solid or liquid—or both—will scatter light and reflect light back in to the detector space. The reflected light may be received by the light sensor. Hence, the magnitude of a signal generated by the light sensor in response to receive light is an indication for pollution of the outer wall of the shield. Therefore, a signal is generated if the difference between the signal received from the sensor and a reference signal value is too high, to warn for pollution.

Alternatively or additionally to providing a warning signal, also another type of information signal based on the first signal may be provided. For example, a value indicating a loss of transmission due to pollution may be reported or a value indicating actual transmission of the shield. The value provided is determined based on the first signal and is provided for a frequency range of electromagnetic waves, in particular for the sunlight spectrum or a part thereof, including at least a part of visible light and, optionally, near infra-red and/or near ultra-violet. Alternatively or additionally, based on a calculated transmission loss due to pollution of the shield, an efficiency loss of a photovoltaic panel may be reported.

In an embodiment, the first light source is arranged for emitting a first light beam that coincides with the shield at a first angle relative to the shield and at a first incidence area on the shield, resulting in a first reflected beam, the first light sensor is arranged for sensing light originating from the first incidence area; and the first light sensor is provided out of the path of the first light beam and the path of the first reflected first light beam.

While measuring the scattered light and reducing or even preventing incidence of direct light or a directly reflected beam, pollution of the shield may be better determined. Reason for this is that in this setup, the first light sensor will predominantly receive light from the first light source that is scattered by pollutants on the outer side of the shield.

Another embodiment of the first aspect comprises a second light sensor arranged for sensing light from the first beam or the first reflected beam. The value from the second sensor may be used to filter out any degradation of the first sensor, the second sensor and the light source.

An embodiment of the device comprises a second light source for emitting light to the shield and a second light sensor arranged to receive light from the second light source, arranged to provide a second sensor signal providing an indication for an amount of light received by the second light sensor. The device according to this embodiment works best in conjunction with the processing unit that is further arranged to compare the first sensor signal to the second sensor signal and generate a second warning signal if a sensor signal difference between the first sensor signal and the second sensor signal is above a second predetermined threshold.

Different sensors and different light sources may be positioned at different locations around the detector. Hence, signals received by the different sensors provide an indication of pollution at different locations of the shield. A difference in values of the first sensor and the second sensor above a particular threshold indicates a difference in pollution at different areas of the shield. If signal values are substantially equal, pollution is homogeneous.

A further embodiment of the device works advantageously if the processing unit is further arranged to generate a third warning signal if a sensor signal difference between the first sensor signal and the second sensor signal is below a second predetermined threshold if the difference between the first sensor signal or the second sensor signal on one side and the reference sensor value on another side is above the first predetermined threshold.

This processing unit generates a signal in case of substantially homogeneous pollution of the shield. Signal distortion due to homogeneous pollution requires less processing power to compensate for.

In a further embodiment, the processing unit is arranged to obtain colour correction data related to colour characteristics of particles of surroundings of the device and the processing unit is arranged to adjust a value of the first signal or to adjust the reference value based on the colour information obtained. Different colour particles scatter light in a different way and may absorb a certain amount of light. Pollution of white particles an pollution of black particles provide different intensities of scattered light, even though they reduce transmission of light through the shield with substantially the same amount. This is because black particles usually absorb more light than white particles. this embodiment allows to compensate for the different signals and provide a signal that provides an uniform signal substantially the same for the amount of blocked light from outside, irrespective from the colour of the pollutants.

A second aspect provides a system for determining soiling of a shield for covering a detector for detecting solar irradiance, comprising the device according to any of the preceding claims and the processing unit.

A third aspect provides a solar panel. The solar panel comprises a laminate comprising a transparent shielding layer and a photovoltaic layer arranged for receiving solar irradiance transmitted through the shielding layer; and the device according to the first aspect. The device is provided such to receive solar irradiance transmitted through the shielding layer.

A fourth aspect provides a method of determining soiling of a shield for covering a detector for detecting solar irradiance in a device. The device comprises a housing, a detector for receiving solar irradiance and for providing a detector signal providing an indication of an amount of solar irradiance received by the detector, the shield, the shield and the housing providing a detector space for housing at least part of the detector. The device further comprises a first light source for emitting light to the shield and a first light sensor for providing a first signal providing an indication for an amount of light received by the first light sensor. The method comprises receiving the first signal, comparing a value of the first signal to a reference sensor value and generating a first warning signal if a difference between the sensed value of the sensor signal and the reference sensor value is above a first predetermined threshold. Alternatively or additionally to comparing the method comprises determining, based on the first signal, a transmission value related to a transmission factor of the shield for a range of electromagnetic waves and output the transmission value.

A fifth aspect provides a computer programme product comprising computer executable instructions for programming a processing unit to enable the processing unit to carry out the method according to the fourth aspect.

BRIEF DESCRIPTION OF THE DRAWINGS

The various aspects and embodiments thereof will now be discussed in further detail in conjunction with Figures. In the Figures,
FIG. 4 A: shows a schematic view of another pyranometer;
FIG. 4 B: shows a schematic view of a further pyranometer
FIG. 4 C: shows a schematic view of yet another pyranometer;
FIG. 4 D: shows a schematic view of again another pyranometer.

DETAILED DESCRIPTION

Figure 1:
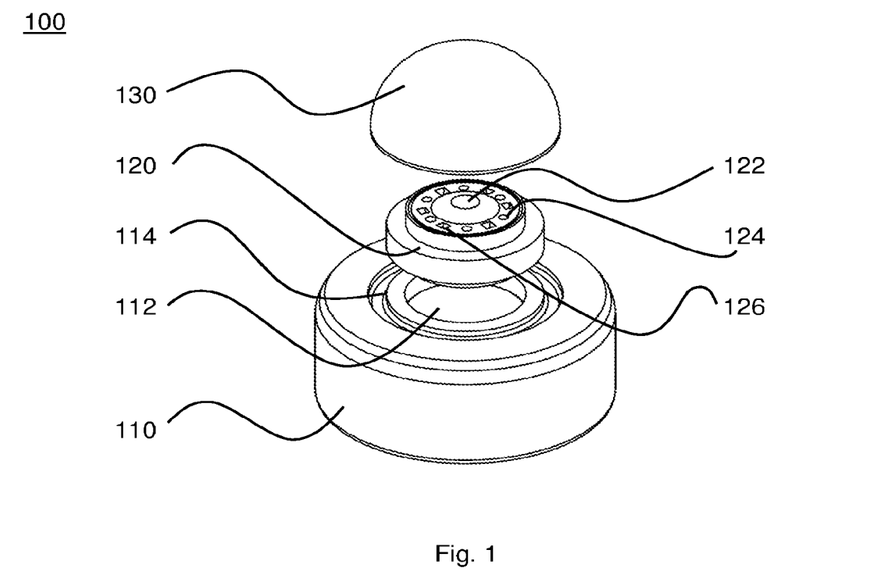
FIG. 1: shows an exploded view of a pyranometer.

FIG. 1 shows a pyranometer 100 as a radiometer. The pyranometer 100 comprises a device housing 110 provided with holder cup 112 for receiving a detector housing module 120 which forms part of the device housing 110. The holder cup 120 may be a through hole in the housing 110. The device housing 110 further comprises an optional circular depression 114 for receiving a rim of a dome 130. At the bottom of the circular depression 114, an O-ring may be provided for providing a substantially watertight closure. The dome 130 is provided for protection of electrical and electronic elements held by the detector housing module 120. The dome 130 acts as a shield to any pollution, yet it is transparent or at least largely transparent for a spectrum of solar irradiation the pyranometer 100 is intended to detect.

The detector housing module 120 comprises a detector 122 for receiving solar irradiation to detect. The detector 122 is arranged to generate a signal upon receiving solar irradiation. Preferably, the detector 122 comprises a thermocouple, though other types of detectors may be envisaged as well. The detector 122 is provided in the centre of the detector housing module 120 and in the centre of the dome 130.

The detector housing module 120 further holds multiple LEDs 124, indicated as circles, as light sources. Alternatively to LEDs, also other light sources may be used, including, but not limited to laser and laser diodes in particular, incandescent or fluorescent light sources, other, or a combination thereof. The LEDs 124 are preferably blue light LEDs, with a spectrum peak between 400 nm and 500 nm. An advantage of such light emitting diodes is that their operation is only to a small extent affected by temperature.

The detector housing module 120 also comprises photo sensors 126, arranged for detecting light and for generating a signal, of which signal the value relates to an amount of light received. The photo sensors 126 are at least sensitive to a spectrum emitted by the LEDs 124.

The LEDs 124 and the photo sensors 126 are preferably arranged such that light emitted by any LED 124 and directly reflected by the inner wall of the dome 130 cannot reach a photo sensor 126. Yet, light scattered by any particle, either solid or liquid, present on the inner wall or the outer wall of the dome 130, may be received by any photo sensor 126. Therefore, viewed from the top of the pyranometer 100, the LEDs 124 and the photo sensors 126 are preferably not aligned on one line with the centre of the detector housing module 120 or with the detector 122.

Figure 2:
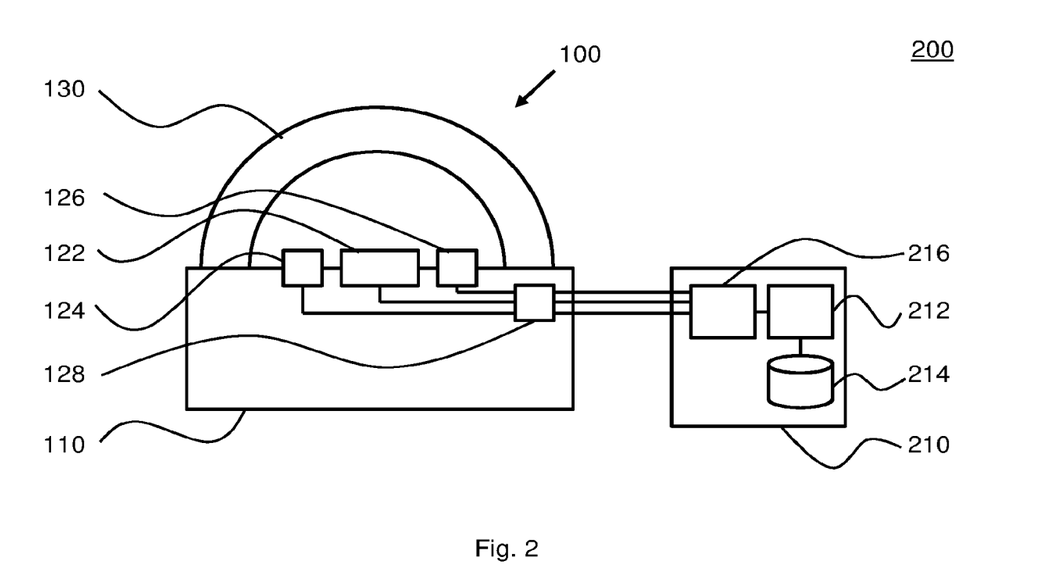
FIG. 2: shows a schematic view of the pyranometer.

FIG. 2 provides a schematic representation of a system 200 for determining soiling of the pyranometer 100. The system 200 comprises the pyranometer 100 with the components discussed above. Furthermore, FIG. 2 shows the pyranometer 100 to comprise an optional pyranometer signal processor 128. The pyranometer signal processor 128 receives signals from the detector 122 and the photo sensors 126, processes the signals and transmits the processed signals to a processing module 210. The processing may include noise reduction, digitalisation, compression, amplification, filtering, other, or a combination thereof. The pyranometer signal processor 128 may also be arranged for controlling operation of the LEDs 124.

Figure 3:
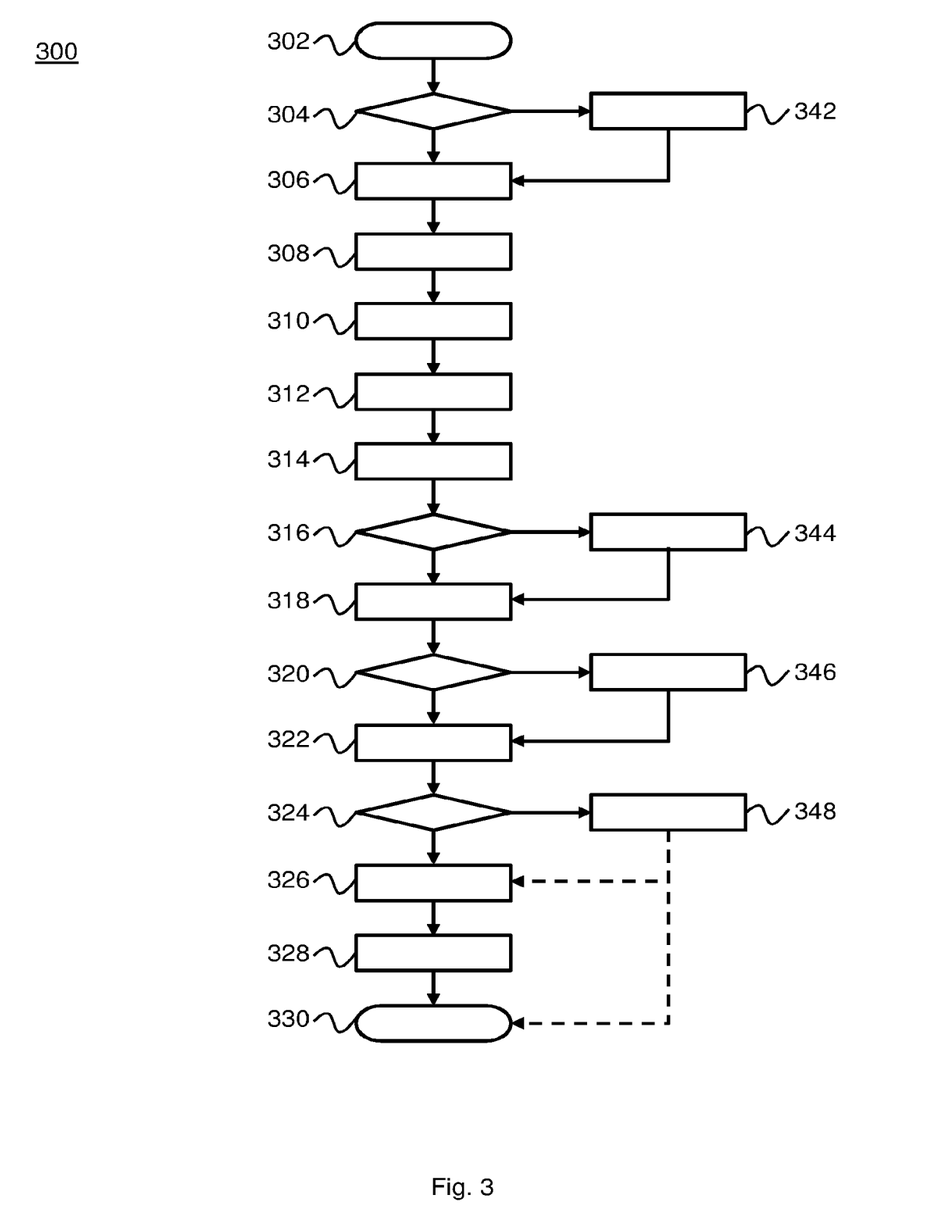
FIG. 3: shows a flowchart.

The processing module 210 comprises a communication unit 216 for receiving signals from the pyranometer 100, either processed or unprocessed. The received signals are provided to a general processing unit 212 for assessment of the signals. The processing module 210 may further comprises a storage module 214 for storing of data, including a computer programme product, like firmware, for programming the general processing unit 212 for executing operations as discussed above and below. The processing module 210 may be a separate entity or comprised by the pyranometer 100. The operation of the system 200 will now be discussed in further detail in conjunction with FIG. 2 and a flowchart 300 provided by FIG. 3. The various parts of the flowchart are briefly summarised in the table below:

- 302 start procedure
- 304 daylight operation?
- 306 light first LED
- 308 light second LED
- 310 receive first signal first photo sensor
- 312 receive second signal second photo sensor
- 314 compare first signal to first threshold
- 316 first signal below threshold?
- 318 compare second signal to first threshold
- 320 second signal below threshold?
- 322 compare first signal to second signal
- 324 difference below threshold?
- 326 determine compensation required
- 328 compensate detector signal
- 330 end
- 342 switch to AC mode
- 344 set first warning signal
- 346 set second warning signal
- 348 set third warning signal The procedure starts in a terminator 302 and proceeds by checking for daylight conditions in step 304. If daylight condition is determined, the procedure branches to step 342 for switching to AC—alternating current—mode and proceeds to step 306. If no daylight condition is determined, the procedure does not branch to step 342 and proceeds to step 306 in DC mode.

In step 306, a first LED is lit and in step 308, a second LED is lit. Alternatively, more or less LEDs 124 are lit, yet in this embodiment, two LEDs 124 are lit. In DC mode, the LEDs 124 are preferably lit continuously for a pre-determined amount of time. In AC mode, the LEDs 124 are preferably lit intermittently for a pre-determined amount of time. As background light like daylight and also other regular light during night time, such as moonlight and street lighting, has a substantially continuous nature, intermittently emitted LED light may be differentiated from background light.

In step 310, a first signal is received from a first photo sensor and a second signal is received from a second photo sensor 126 in step 312. The first LED 124 and the second LED 124 may be activated over the same period or over different periods, either overlapping or complementary, in DC as well as in AC mode. So the second photo sensor 126 may receive light from the first LED 124 as well as from the second LED 124. This applies to the first photo sensor 126 as well.

The signals received from the photo sensors 126 are generated by the photo sensors 126 in response to receiving light. That light may originate from the LEDs 124, but also from background light such as sun, moon, street lighting, other, or a combination thereof. The AC mode is devised to compensate for light not originating from the LEDs 124.

In the AC mode, the receiving of the signals includes determining an alternating component in the received signal, preferably a component alternating at the same frequency as at which the LEDS 124 intermittently emit their light. More in particular, an amplitude of the alternating component is determined as a signal value and a signal magnitude in particular for each of the signals provided by the photo sensors 126.

In step 314, the first signal and in particular a magnitude of the first signal is compared to a pre-defined threshold. Over normal operation of the pyranometer 100, only a small amount of the light emitted by the LEDs 124 will be reflected by the inner wall of the dome 130 and most of the light will pass through the dome 130. If the outer wall of the dome 130 is soiled, light passing through the dome 130 will be scattered and reflected towards the space inside the dome 130. The scattered light is received by the photo sensors 126. Hence, an increased amount of light received by the photo sensors 126 and an increased signal magnitude provide an indication of soiling of the outer wall of the dome 130.

Therefore, if the magnitude of the first signal is below a first pre-determined threshold, the soiling of the outer wall of the dome 130 is determined to be below a per-determined threshold. This is implemented in step 316: if the first signal is below the first pre-determined threshold, the process proceeds to step 318 in which the magnitude of the second signal is compared to a second pre-determined threshold. If the first signal is above the first pre-determined threshold, the process branches to step 344 in which a first warning signal is set, to indicate the outer wall of the dome 130 is soiled above a particular level—and action may need to be taken.

Alternatively or additionally to providing the first warning signal, the first value of the first signal may provided to a user, for example on a display. Alternatively, the first signal is processed to provide other useful information to a user. Such information may be a loss of transparency of the shield, an indication of a level of pollution of the shield, a level of production loss of a photovoltaic panel in the vicinity of the pyranometer, other, or a combination thereof.

After step 318, the process continues to step 320. In this step, if the magnitude or another value of the second signal is above the second pre-determined threshold, the process branches off to step 346 in which a second warning signal is set. If the magnitude or another value of the second signal is below the second pre-determined threshold, the process continues to step 322. Also after step 346, the process continues to step 322. The second pre-determined threshold may be the same as the first pre-determined threshold—or different.

In step 322, values of the first signal and the second signal are compared. Preferably, magnitudes of the signals are compared. As discussed above, photo sensors 126 and LEDs 124 are distributed along the detector and preferably at regularly distances. It is noted that preferably, a photo sensor 126, the detector 122 and an LED 124 are not provided on one line. So each photo sensor receives light shattered by another particle at the outer wall of the dome 130 or shattered by multiple particles at particular areas of the outer wall of the dome 130.

This means that, if the signal values compared are substantially equal—or differ by not more than a third pre-determined threshold, the soiling of the outer wall of the dome 130 is substantially homogeneous. If the signal values compared differ by more than the third pre-determined threshold, the soiling of the outer wall of the dome 130 is determined to be homogeneous.

If the soiling of the outer wall of the dome 130 is determined to be homogeneous, difference between the first signal and the first pre-determined threshold and/or difference between the second signal and the second pre-determined threshold may provide an indication for compensation of a detector signal generated by the detector 122 upon receiving irradiation. Homogeneous soiling affects the general sensitivity of the pyranometer 100 in general, which allows for determining a compensation. This will be discussed below in further detail.

Compensation may also be possible in case of inhomogeneous soiling, though this will be more difficult as it is difficult to determine the distribution of the soiling. In particular if the level of soiling is distributed randomly over the outer wall of the dome 130, determining a way of compensating the detector signal to take the soiling into account is a tedious task. Whereas it may be possible, this embodiment will only compensate for soiling if substantial homogeneous soiling is determined.

Additionally or alternatively, providing compensation may comprise providing an accuracy estimator. The accuracy estimator may be provided as a percentage of a measurement value or a value of a signal provided by the detector 122. Alternatively, it may be provided as an absolute value, to be added to or subtracted from a detected value.

A radiometer like the pyranometer 100 has an accuracy of about 1%, out of manufacturing. However, soiling of the dome 130 of the pyranometer 100 may seriously affect the accuracy of the pyranometer 100 as not all light incident to the pyranometer 100 reaches the detector 122. This may even be the case if homogeneous soiling has been determined. A decreased accuracy may be caused by randomness of soiling: even when homogeneous is detected, the soiling will have a random character. This random character means transparency of the dome 130 to radiation to be detected will also be affected in a random way.

The value with which accuracy is to be corrected due to soiling may be determined based on experimental data. Experiments may provide a link between a level of soiling, a level of homogeneity of the soiling, a signal level of a signal generated by the detector 122, another factor or a combination thereof on one hand and the accuracy of the detector 122 under particular circumstances on the other hand. The corrected accuracy value may be used for correcting a signal level. Alternatively or additionally, the corrected accuracy level may be provided as such to an observer of the system 200 as shown by FIG. 2.

In step 324, the process branches to step 348 if the difference between the first signal and the second signal is above the third pre-determined threshold. In step 348, a third warning signal is issued and the process branches to a terminator 330 and the process ends.

The process branches to step 326 from step 324 if the difference between the first signal and the second signal is below the third pre-determined threshold—and substantially homogeneous soiling is determined. In step 326, a particular amount and, in case desired and available, a particular method of compensation is determined. It may be determined the detector value is only to be multiplied by a fixed amount. Alternatively or additionally, compensation may be made dependent on the time of the day.

A reason for doing so is that soiling of the outer wall of the dome 130 results in scattering of sunlight. This means that if the sun is very low, for example at an angle of less than five degrees with earth's surface, yet more light will be received by the detector 122 due to the scattering of particles. And if the sun is at a high position, around noon, the detector 122 will receive less radiation as certain radiation will be reflected away from the detector 122, depending on distribution of particles or any other type of soiling.

The compensation may be made more accurate by providing a compensation curve comprising a compensation factor as a function of the time of day. Further accuracy may be obtained by providing calibrated curves per specific location. A reason for providing location dependent curves is that the nature of soiling particles and dust particles in particular vary per geographical location. The compensation value may be used for correcting the signal generated by the detector 122 or by correcting another value representing sun radiance intensity at a further step of processing the signal provided by the detector 122.

In step 328, the compensation determined in step 326 is applied to the detector signal. Subsequently, the process ends in the terminator 330.

The processing of the signals, from the photo sensors 126 and from the detector 122, is handled by the general processing unit 212. In the embodiments discussed above, the general processing unit 212 is comprised by the processing module 210. Alternatively, the general processing unit 212 is comprised by the housing 110 of the pyranometer 120.

FIG. 1 and FIG. 2 show a particular configuration of the pyranometer 100 and the dome 130, the LEDs 124 and the photo sensors 126 in particular. In the embodiments shown by FIG. 1 and FIG. 2, the LEDs 124 and the photo sensors 126 are provided in a single plane, with the LEDs 124 and the photo sensors 126 provided in a concentric circle around the detector 122. Furthermore, the LEDs 124 and the photo sensors 126 are provided in one space, defined by the housing 110 and the detector housing module 120 in particular on one side and the dome 130 on the other hand.

FIG. 4A shows another embodiment, in which the LED 124 is arranged to couple light into the material of the dome 130. At another position at the rim of the dome 130, the photo sensor 126 is provided for receiving—more or less—light emitted by the LED 124. Soiling of the outer wall of the dome 130 provides particles at the dome having a particular refractive index. This may result in light emitted by the LED 124 to be coupled out of the dome 130. And, in turn, this results in less light received by the photo sensor 126, resulting in a change of signal strength provided by the photo sensor 126.

FIG. 4B shows a further embodiment of the pyranometer 100. Pyranometers are not uncommonly provided with two domes. FIG. 4B shows the pyranometer having two domes, an outer dome 130 and an inner dome 132. Within the inner dome 132, the detector 122 is provided. In space defined by the housing 110, the outside of the inner dome 132 and the inner wall of the outer dome 130, the LEDs 124 and the photo sensors 126 are provided. The pyranometer 100 as shown by FIG. 4B has a working principle equivalent to that of the pyranometer shown by FIG. 1.

FIG. 4C shows a yet another embodiment, a radiometer 100 having a flat window 130 as a shield for shielding the detector 122. The radiometer 100 is not designed as a common pyranometer, though it may be used for other measurement with respect to intensity and/or radiation of the sun. For example, the radiometer 100 as depicted by FIG. 4C may be embodied as a pyrheliometer. Also the radiometer 100 shown by FIG. 4C comprises a housing 110 and a space defined between the housing 110 and the shield 130 for housing the detector 122, one or more LEDs 124 and one or more photo sensors 126.

Figure 4:
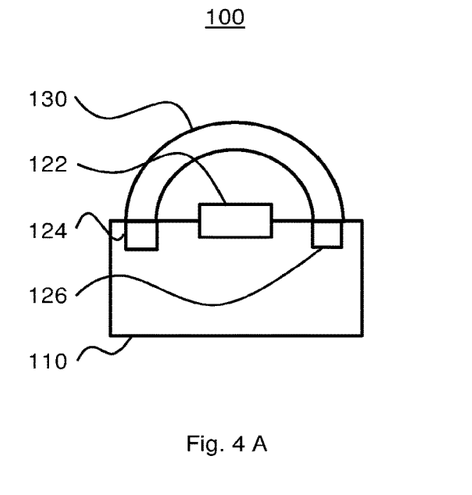

In yet another alternative, the LED 124 and the photo sensor are provided at opposite sides of the dome 130 or the shield 130. FIG. 4 D shows a detector device 400 as again another embodiment. The detector device 400 shown by FIG. 4 D may have the same construction as the radiometer 100 shown by FIG. 4 C, though without the detector 122. The detector device 400 is primarily intended for detecting soiling of the shield 130. The shield 130 may be directly comprised by the detector device. Alternatively or additionally, the shield of which the soiling is to be detected is a window of a building, like a greenhouse, or a cover of a photovoltaic laminate. Hence, the detector device 400 may be provided without shield of its own; a transparent part of the building, like a window, fulfils the function of the shield. In such embodiment, the detector device 400 comprises a shield connection member for connecting the detector device 400 to a panel of which the soiling is to be determined. The shield connection member may be embodied as a ridge as shown by FIG. 4 D, at the outer perimeter of the detector device 400. Alternatively or additionally, adhesive elements may be provided, like glue, suction cups, other, or a combination thereof. Yet, providing the detector device 400 with some shielding is preferred for protection of the components. Such shield of the device itself does not play a role in detection of soiling of a window or other transparent panel of the building.

The soiling detection is not limited to the shield comprised by the detector device, it may also be used for detecting soiling of a further shield like a window. In that case, the shield 130 of the detector device 400 is place in close vicinity or even in contact with the window. Between the window and the shield 130, a substance may be provided for adaptation of refractive indexes to prevent unwanted reflections at interfaces of shield, window and air.

Figure 5:
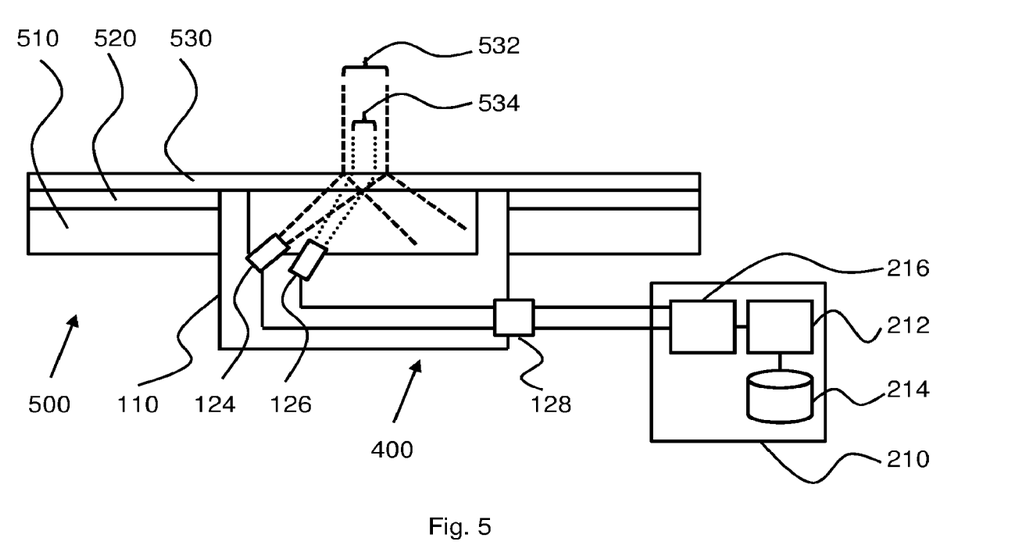
FIG. 5: shows a more detailed view of a device for detecting soiling of a shield.

Whereas it is preferred that the LED 124 and the photo sensor 126 are provided within one and the same housing 110, embodiments may be envisaged in which the photo sensor 126 and the LED 124 are placed on either side of a transparent surface of which soiling is to be detected. The detector device 400 may be embodied in various ways, of which examples are provided below. FIG. 5 shows the detector device 400 provided in a photovoltaic panel 500. The photovoltaic panel 500 comprises a transparent front layer 530, a photovoltaic active layer 520 and a support layer 510. The transparent front layer 530 may be provided in glass, an organic polymer, other, or a combination thereof and is transparent for at least a part of the spectrum of electromagnetic radiation to which the active layer 520 is sensitive. The transparent front layer 530 may be provided with an anti-reflective coating.

The photovoltaic active layer 520 preferably comprises a semiconductor material like silicon, germanium, gallium arsenide, other, or a combination thereof. The active layer 520 comprising one or more junctions between areas that have opposite conductivity types. The support layer 510 comprises a material suitable to provide rigidity to the photovoltaic panel 500.

The detector device 400 is in this embodiment integrated in the photovoltaic panel 500. For integration in the photovoltaic panel 500, the active layer 520 and the support layer 510 are locally omitted or removed for accommodating the detector device 400. Whereas this constitutes a preferred embodiment, the detector devices 400 presented in the various examples may also be provided as stand-alone devices as presented by FIG. 4 D. Otherwise, the detector device may be provided at the inside of a glass panel of a greenhouse or another building.

In this embodiment, the detector device comprises a first light emitting diode—LED—124 as a light source. The first LED 124 has a focussed beam. The focussing may be enabled by providing the first LED 124 with a lens, a collimator, another optical beam forming element, or a combination thereof. The beam of the first LED 124 is directed towards the front layer 530 of the photovoltaic panel 500, which front layer 530 acts as a shield for the detector device 400. More in particular, the beam of the first LED 124 is directed to the front layer 530 under a first angle and projects the beam on a first area of incidence 532. The area of incidence is in this embodiment defined at the outer side of the front layer 530.

The detector device further comprises a first light sensor 126 that may be embodied as a photodiode or any other suitable device or devices. The first light sensor 126 is arranged in the detector device 400 to detect light in a small area, thus detected within a relatively narrow first sensor beam indicated by the dotted line in FIG. 5. The first sensor beam coincides with the outer side of the front layer 530 at a first detection area 534.

The first detection area 534 is in this embodiment provided within the first area of incidence 532. In another embodiment the two areas may have the same size, one may be larger than the other or the other way around; most important is that the two areas at least partially overlap. In yet another embodiment, the first light sensor is arranged to sense light at a wide angle, resulting in a large detection area.

Particles on the outside of the front layer 530—dust, sand, pollen, soot, other, or a combination thereof—reflect light emitted by the first LED 126 in a scattered fashion. The amount of light scattered provides an indication of an amount of pollution on the outside of the front layer 530.

To properly determine an amount of scattered light, it is advantageous that the first light sensor 126 does not receive any direct light emitted by the first LED or light within the reflected first beam. The reflected first beam may be a beam reflected by the inside of the front layer 530, the outside of the front layer or a beam provided by both reflections. The reflected first beam extends from the front layer under the same angle as under which the first beam is incident to the front layer.

To prevent or at least reduce incidence of direct light of the first beam or the first reflected beam, the first light sensor 126 may be provided such that it is located out of the light path of the first beam or the first reflected beam. Alternatively or additionally, the first light sensor 126 is provided with a lens, a collimator or another optical element for reducing a detection angle of the first light sensor.

As depicted by FIG. 5, the first sensor beam is provided under an angle different from the angle under which the first beam is incident to the front layer 530. Either the angle under which the first sensor beam is provided, the location of the first light sensor 126 within the detector device 400 or both parameters may both be tweaked to ensure in particular light scattered by potential particles on top of the front layer 510 arrives at the first light sensor 126. In the same way, a minimum amount or at most a very small amount of light of the first beam or the reflected first beam arrives at the first light sensor 126. This allows for accurate determination of scattered light. And if a proper position is picked, the angle under which the first light sensor 126 is provided may be the same as the angle under which the first LED 124 is provided.

The scattered light detected by the first light sensor 126 is processed by means of a signal processor 128 which is arranged to amplify, filter, encode, decrypt, compress or digitise the signal or provide a combination of these and/or other processing. The processed or unprocessed signal is provided to the a processing module 210. The processing module 210 comprises a communication unit 216 for communicating with the detector device 400.

The communication unit 216 may be arranged for processing the signal in accordance with processing performed by the signal processor 128; the received signal may for example be decompressed. The signal processed by the communication unit 216 is provided to the processing unit 212. The processing unit 212 may provide further processing of the signal, for example determining an average value, a derivative of the signal value over time, other, or a combination thereof.

The processing unit 212 is further arranged to compare the processed signal value, the instantaneous signal value or a combination thereof to one or more pre-determined values stored in a storage module 214 comprised by the processing module 210. Based on that comparison, a warning signal may be presented if the amount of scattered light sensed is too high, as this may be an indication of pollution of the front layer 530. And if the front layer 530 is polluted, less light will reach the active layer 520 and less energy may be generated.

Alternatively or additionally to providing the first warning signal, the first value of the first signal may provided to a user, for example on a display. Alternatively, the first signal is processed to provide other useful information to a user. Such information may be a loss of transparency of the shield, an indication of a level of pollution of the shield, a level of production loss of a photovoltaic panel in the vicinity of the detector device 400 or in which the detector device 400 is provided, other, or a combination thereof.

Performance of LEDs is known to degrade over time. Some LEDs have a performance degradation already in the first active hour, typical LEDs lose a few percent of their performance after 10.000 to 20.000 hours and even half their performance after approximately 100.000 hours. Degradation of the performance of the first LED 124 results the processing module 210 being able to determine an amount of pollution in a less accurate way. If the first LED 124 produces less light, less light will be reflected by the same amount of particles on the outside of the front layer 530 and the signal value generated by the first light sensor 126 will be less, with the same amount of pollution. Without correction for the degradation, the processing module 210 will report less pollution than is present in reality.

Figure 6:
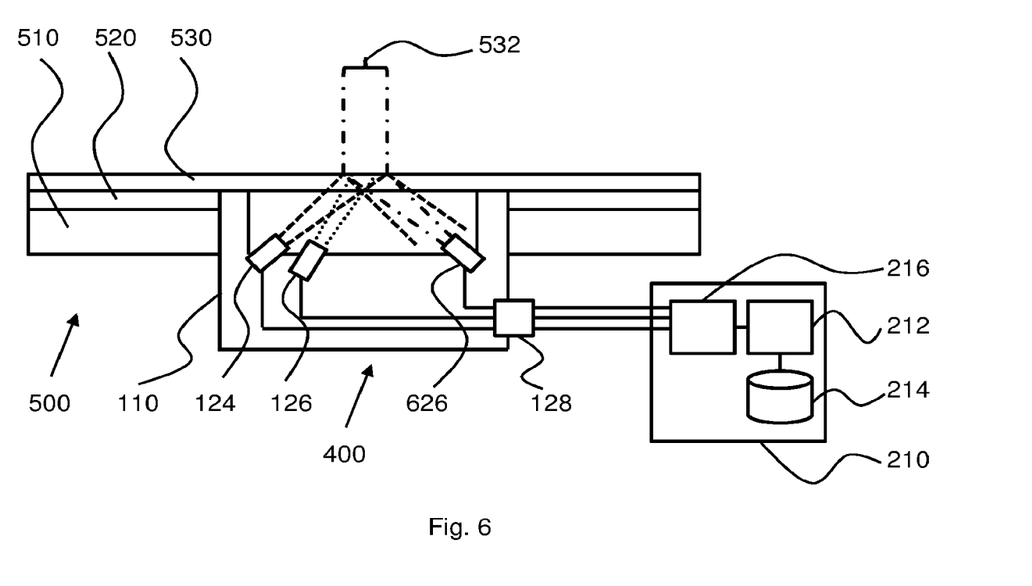
FIG. 6: shows another device for detecting soiling of a shield.

FIG. 6 provides the same photovoltaic panel 500 with the detector device 400 as shown by FIG. 5. In addition to the detector device shown by FIG. 5, FIG. 6 shows the detector device 400 comprising a second light sensor 626. Other than the first light sensor 126, the second light sensor 626 is arranged to receive light directly from the first beam or from the reflected first beam. Receiving light directly from the first beam is preferred over measurement on the reflected first beam, as the intensity of the reflected beam may be influenced by scattering by particles at the outside of the shield. The signal generated by the second light sensor 626 in response to receiving the direct light is processed and subsequently evaluated for the signal value by the processing module 210.

By assessing pollution of the front layer 530 based on a quotient of a first value of the first signal provided by the first light sensor 126 on one hand and a second value of the second signal provided by the second light sensor 626, the factor of the degradation of the first LED 124 is filtered out as a factor that may influence the determined amount of pollution. It is noted that should there be question of degradation of the light sensors, such degradation is also filtered out. Optionally, the first value of the first signal provided by the first light sensor 126 is divided by the first value plus the second value. This is particularly preferred if the directly reflected signal is measured by the second light sensor 626, rather than the direct beam provided by the first LED 124.

The amount of light scattered by polluting particles depends on characteristics of the particles. Colour of the particles is a relevant factor in this aspect, apart from other aspects like state of the particle—liquid or solid—material of the particle, smoothness of the particles (rounded vs. sharp edges), other, or a combination thereof. The colour of a particle is an important factor in the amount of light scattered. With the same amount of polluting particles or with the same amount of the front layer 530 covered with polluting particles, white pollution and highly reflective pollution will provide more scattered light than black pollution or mat pollution. It is preferred to correct a signal value received from the first sensor to adjust for this effect.

Information on adjustment may be provided by storing once or periodically, with updates, correction information comprising a correction factor, in the storage module 214. Additionally or alternatively, the colour of the pollution may be determined automatically. The configuration shown by FIG. 7 is arrange to provide a correction factor to compensate to at least some extent for differences in colour of pollution.

Figure 7:
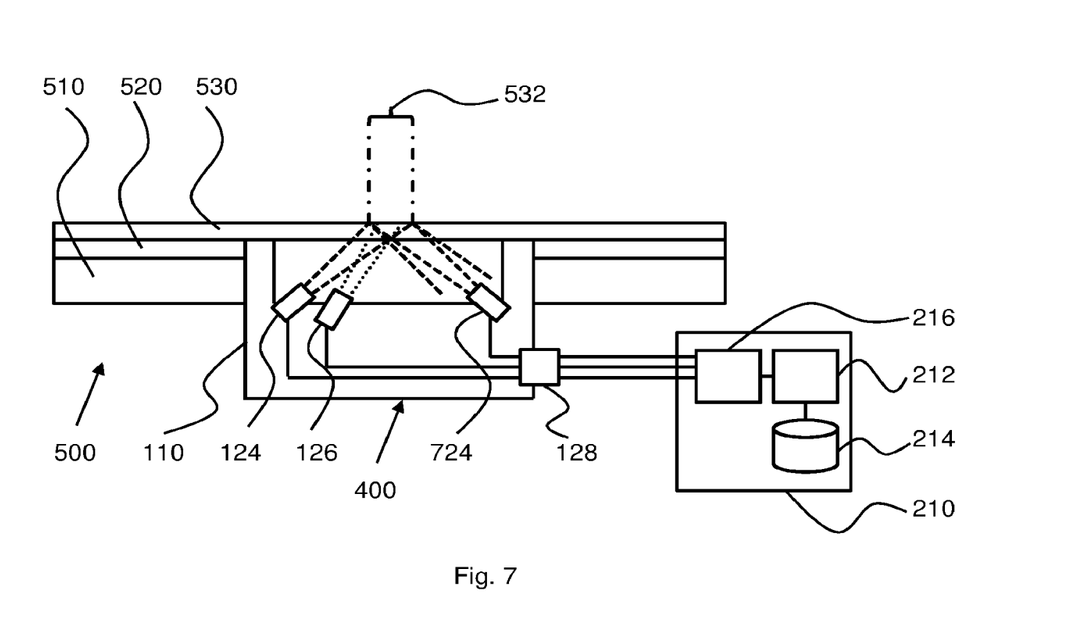
FIG. 7: shows a device for detecting soiling of a shield with two light sources having different spectra.

In the configuration shown by FIG. 7, the detector device comprises a second LED 724 as a second light source. The second LED 724 emits light in a second spectrum, that is different from the first spectrum at which the first LED 124 emits light. More in particular, the first spectrum as a part that has no overlap with the second spectrum and the second spectrum has a part that does not overlap with the first spectrum. For example, the first spectrum covers red to yellow and the second spectrum covers yellow to blue. And the first light sensor 126 is arranged to be sensitive to the total of the first spectrum and the second spectrum—or at least the largest part of the combined spectrum, including the non-overlapping parts.

The first LED 124 and the second LED 724 are operated one after the other. Depending on a first signal value with the first LED 124 switched on and a second signal value with the second LED 724 switched on, the colour of the scattered light, collected by the first light sensor, may be determined. If the first signal value is higher with the first LED 124 switched on compared to the second signal value with the second LED 724 switched on, it is likely the colour of the particles is reddish, this may indicate the particles comprise sand. If it is the other way around, the particles may be greenish, indicating presence of algae. The processing of the signals received, as well as the method for controlling the LEDs may be executed by the processing module 210 and the processing unit 212 in particular.

Figure 8:
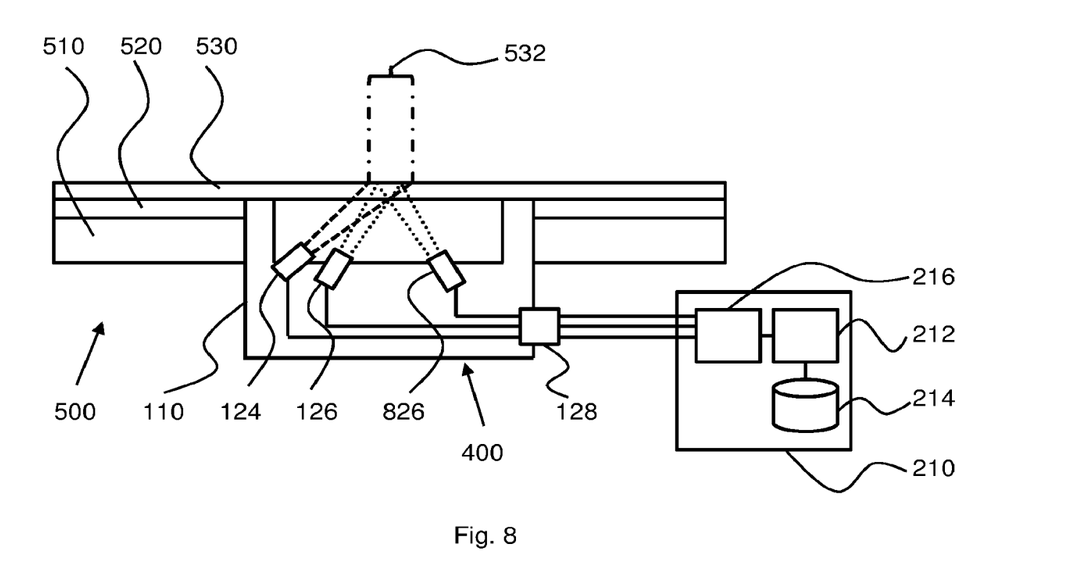
FIG. 8: shows a device for detecting soiling of a shield with two light sensors responsive to different spectra.

FIG. 8 shows another embodiment, in which the detector device 400 comprises the first LED 124, the first light sensor 126 and a third light sensor 826. Like the first light sensor 126, the third light sensor 826 is arranged to capture light scattered by particles at the outer side of the front layer 530, rather than a beam of light provided by the first LED 124.

Whereas the embodiment discussed in conjunction with FIG. 7 makes use of a wide band sensor and two narrow band light sources, the embodiment shown by FIG. 8 makes use of a wide band light source and two narrow band light sensors. More in particular, the first LED 124 is in this embodiment arranged to emit light over a large part of the visible spectrum. To this purpose, the first LED 124 may be an LED module, comprising LEDs emitting light at different narrow spectra. Alternatively or additionally, the first LED 124 is a white LED, i.e. a blue light LED covered with a layer breaking down blue light into light with multiple longer wavelengths or lower frequencies.

Likewise, the first light sensor 126 is arranged to cover a lower part of the spectrum emitted by the first LED 124 and the third light sensor 826 is arranged to be sensitive to a higher part of the spectrum emitted by the first LED 124. For obtaining at least some colour information on particles on the outer side of the front layer 530, the first LED 124 is switched on and signal values of signals provided by the light sensors are compared. If a first signal value provided by the first light sensor 126 is higher than a third signal value provided by the third light sensor 826, the particles probably have a reddish colour and if the first signal value is lower than the third signal value, the particles probably have a greenish colour.

The embodiments discussed in conjunction with FIG. 7 and FIG. 8 may be extended with more LEDs, light sensors, or both for more accurate detection of the colours of particles polluting the front layer 530. An issue that may not be directly addressed at this point is an amount of absorption of the particles; pure black particles will provide the same frequency response on sensors are pure white particles. However, pure white particles will provide higher signal values as they reflect more light than black particles. Black particles will absorb more light.

To address this issue, the intensity of light directly emitted by the light sources may be measured and the intensity of the light of light in the beam reflected by the front layer 530 may be measured and both values are compared. These values, optionally together with a value indicating an amount of received scattered light, may provide an indication of an amount of light absorbed by the particles. And the amount of absorption may provide a further indication on characteristics of the particles, which, in turn, may contribute to providing a correction factor.

Figure 9:
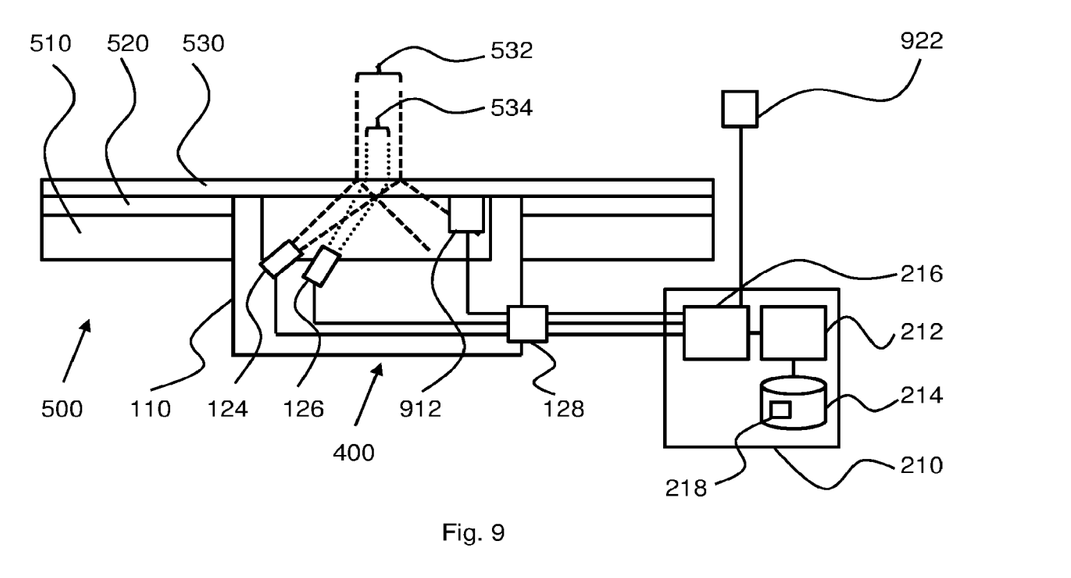
FIG. 9: shows a device for detecting soiling of a shield with a colour sensor.

FIG. 9 shows another embodiment for determining colour of particles on the front layer 530 or in the surroundings of the photovoltaic panel 500. The configuration shown by FIG. 9 is based on the configuration discussed in conjunction with FIG. 5. In addition to the configuration discussed in conjunction with FIG. 5, at least one of a first colour sensor 912 and a second colour sensor 922 may be added to the system. The first colour sensor 912 is provided in the detector device 400, preferably close to or in contact with the front layer 530. This allows the first colour sensor 912 to gather information on colour or colours of particles present at the outside of the front layer 530. This information may be used to look up a correction factor in a correction factor database 218 stored on the storage module 214.

The second colour sensor 922 is provided apart from the photovoltaic panel 500. This allows the second colour sensor 922 to collect information on colour within the surroundings of the photovoltaic panel. This information may be used to look up a correction factor in a correction factor database 218 stored on the storage module 214.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on" or "onto" another element, the element is either directly on the other element, or intervening elements may also be present.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

The invention claimed is:

1. A device for detecting soiling of a shield, the device comprising:
   a housing;
   a shield connection body for connecting the device to a shield;
   a first light source that is arranged to project a first light beam that is incident on a surface of the shield at a first angle relative to the normal, the first light source being intermittently lit;
   a first light sensor arranged to (i) receive and detect light projected from the first light source that scatters from the surface of the shield in a direction that extends toward the first light source; and (ii) provide a first signal providing an indication for an amount of light detected by the first light sensor, wherein the first light sensor is arranged to detect light from the shield at a second angle relative to the normal, and the second angle is smaller than the first angle; and
   a processing unit;
   wherein: the shield and the housing provide a sensor space for housing the first light source and the first light sensor; and
   the processing unit is arranged to perform the following:
      determine, from the first signal, a component of the received light at the first sensor that matches a frequency at which the first light source is lit;
      determine a signal magnitude value corresponding to an amplitude of the component of the received light;
      compare the signal magnitude value of the first signal to a reference sensor value;
      generate a first warning signal if a difference between the signal magnitude value and the reference sensor value is above a first predetermined threshold, wherein the reference sensor value is based upon the first light source being intermittently lit and compensates for a background light; and
      determine, based on the first signal, a transmission value related to a transmission factor of the shield for a range of electromagnetic waves and output the transmission value.

2. The device according to claim 1, wherein:
   the first light beam that coincides with the shield at a first angle relative to the shield, resulting in a first reflected light beam; and the first light sensor is provided out of the path of the first light beam and in the path of the first reflected light beam.

3. The device according to claim 2, further comprising a second light sensor arranged to detect light from the first light beam or the first reflected light beam, and provide a second signal providing an indication for an amount of light detected by the second light sensor.

4. The device according to claim 3, wherein the processing unit is arranged to:
determine a ratio between the signal magnitude value of the first signal and a signal magnitude value of the second signal; and
generate a second warning signal if the ratio is above a second predetermined threshold.

5. The device according to claim 1, further comprising:
a second light source that is arranged to project a second light beam on the surface of the shield; and
a second light sensor arranged to detect light from the second light source via the shield when connected to the device, the second light sensor being arranged to provide a second signal providing an indication for an amount of light received by the second light sensor;
wherein the processing unit is further arranged to:
compare the first signal to the second signal; and
generate a second warning signal if a sensor signal difference between the first signal and the second signal is above a second predetermined threshold.

6. The device according to claim 5, wherein the processing unit is further arranged to generate a third warning signal if a sensor signal difference between the first signal and the second signal is below a second predetermined threshold and if the difference between the first signal or the second signal on one side and the reference sensor value on another side is above the first predetermined threshold.

7. The device according to claim 1, wherein the shield is shaped as a dome.

8. The device according to claim 7, further comprising a further dome provided around the dome, defining a dome space between the dome and the further dome.

9. The device according to claim 1, wherein:
the processing unit is arranged to obtain colour correction data related to colour characteristics of particles of surroundings of the device, and
the processing unit is arranged to adjust a value of the first signal or to adjust the reference sensor value based on the colour correction data obtained.

10. The device according to claim 9, wherein the processing unit is arranged to obtain information on colour characteristics of particles of surroundings of the device; and
retrieve the colour correction data based on the obtained information on colour characteristics.

11. The device according to claim 10, further arranged to be connected to a colour sensor for obtaining the colour characteristics of particles of the surroundings of the device.

12. The device according to claim 9, further comprising a second light source, wherein:
the first light source is arranged to emit light in a first spectrum and the second light source is arranged to emit light in a second spectrum;
the first spectrum comprises a part that is not overlapped by the second spectrum and the second spectrum comprises a part that is not overlapped by the first spectrum; and
the first light sensor is arranged to detect light in the first spectrum and the second spectrum.

13. The device according to claim 12, further comprising a second light sensor, and wherein;
the second light source projects a second light beam that coincides with the surface of the shield at a second angle relative to the shield and at a second incidence area on the surface of the shield, resulting in a second reflected light beam;
the second light sensor is arranged to detect light originating from the second incidence area; and
the second light sensor is provided out of the path of the second light beam and the path of the reflected second light beam.

14. The device according to claim 9, further comprising a third light sensor, wherein:
the first light beam that coincides with the shield at a first angle relative to the shield, resulting in a first reflected light beam;
the first light sensor is arranged to detect light in a first spectrum and the third light sensor is arranged to detect light in a second spectrum;
the first spectrum comprises a part that is not overlapped by the second spectrum and the second spectrum comprises a part that is not overlapped by the first spectrum;
the third light sensor is arranged to detect light originating from the first area of incidence; and
the third light sensor is provided out of the path of the first light beam and the path of the first reflected light beam.

15. The device according to claim 14, wherein the first light source is arranged to emit light that comprises a part of the first spectrum not overlapped by the second spectrum and a part of the second spectrum not overlapped by the first spectrum.

16. The device according to claim 1, wherein the processing unit is further arranged to:
control the first light source to emit light intermittently so that the first signal is an alternating signal.

17. The device according to claim 1, further comprising a detector for receiving solar irradiance and for providing a detector signal providing an indication of an amount of solar irradiance received by the detector, wherein the shield is transparent to at least part of the solar irradiance to be detected, the shield and the housing providing a detector space for housing at least part of the detector.

18. The device according to claim 17, wherein the first light source and the first light sensor are provided on a substantially concentric circle around the detector.

19. The device according to claim 17, wherein the first light sensor, the detector and the first light source are provided in one plane.

20. The device according to claim 1, wherein the first light source is arranged to project the first light beam on the surface of the shield over a first area of incidence on the surface, and the first light sensor is arranged to detect light from a first detection area on the surface of the shield, and wherein the first area of incidence and the first detection area at least partially overlap and the first detection area is smaller than the first area of incidence.

21. The device according to claim 1, wherein the surface of the shield is an outer surface of the shield that is susceptible to soiling.

* * * * *